Aug. 8, 1933.  E. ANDERSON  1,921,598
POWER TRANSMISSION MECHANISM
Filed March 11, 1931   4 Sheets-Sheet 1

INVENTOR
Emil Anderson
BY
Marshall & Hawley
ATTORNEYS

Fig. 7. Lowest Speed

Fig. 8. 2d. Speed 2-1

Fig. 9. Direct

Patented Aug. 8, 1933

1,921,598

UNITED STATES PATENT OFFICE 1,921,598

POWER TRANSMISSION MECHANISM

Emil Anderson, Briarcliff Manor, N. Y.

Application March 11, 1931. Serial No. 521,633

16 Claims. (Cl. 74—34)

This invention relates to power transmission mechanisms.

Although the invention has been particularly developed for and adapted for motor vehicles, it should be understood that it is not limited to this specific use but may be utilized wherever power is to be transmitted at variable speeds from a driving to a driven shaft.

It is well known that comparatively little torque or power is required to keep a motor vehicle rolling at high speed on a substantially level road surface. However, with the ordinary transmission in which "direct drive" is the only high speed available, the engine must turn over at the same speed as the transmission shaft in order to keep the car up to speed. This condition is obviously uneconomical and wasteful.

Furthermore, in most transmissions, up to a short time ago, it was impossible to "free wheel" or coast without throwing out the clutch. Free wheeling when the car is rolling faster than the engine is turning over obviously effects a considerable economy in operation of the engine.

One of the objects of the invention is to provide a transmission combining the advantages of an over speed or over direct drive and free wheeling.

Another object of the invention is to simplify the transmission of power from an engine to a transmission shaft or other parts to be driven and provide a transmission so constructed and arranged that it will automatically respond to variations in torque on the driven shaft.

Another object of the invention is to provide a transmission so constructed and arranged that the drive can be automatically shifted from over direct to free wheeling, and vice versa.

Another object of the invention is to provide mechanism of the character described, so constructed and arranged as to effectively prevent any backward rolling of the vehicle when the vehicle has been stopped ascending a hill.

Another object of the invention is to provide transmission mechanism so constructed and arranged that a vehicle equipped therewith can free wheel or coast but will be automatically connected to the engine through over direct or over speed driving connections when the engine is accelerated and the driving connections are operated at a faster rate of speed than the rate of rolling of the vehicle.

Another object of the invention is to provide transmission mechanism so constructed and arranged that it will operate quietly and efficiently.

Another object of the invention is to provide transmission mechanism so constructed and arranged as to insure more effective braking action.

Another object of the invention is to provide a transmission having the characteristics and advantages set forth but comprising a minimum number of parts and capable of fitting into the ordinary transmission case.

Further objects of the invention will appear from the following specification taken in connection with the drawings which form a part of this application, and in which.

The invention briefly described consists of a drive shaft, a driven shaft, and operative driving connections between said shafts constructed and arranged to transmit the drive to the driven shaft at a plurality of speeds ranging from a low speed which may be considerably lower than the ordinary low or first speed to a high speed which is higher than direct drive or, in other words, constitutes an over direct drive. The operative driving connections are furthermore so constructed and arranged that the drive will be automatically stepped up from low speed to over direct as the torque required to propel the car or to operate the driven shaft decreases or as the torque furnished by the engine increases.

Furthermore, the transmission mechanism includes means for automatically shifting from over direct drive to free wheeling, and vice versa, and is also so constructed and arranged that the gearing can be locked to insure effective braking action.

The drive between the drive shaft and driven shaft is transmitted through differential or planetary mechanism and the variations in the drive are obtained by varying the driving connections to the operative parts of the differential. In the particular form of the invention shown, the driven shaft is connected to the differential housing which carries the planet gears or differential pinions, the gear at one side of the differential is operated at direct drive, and the gear at the other side of the differential is varied in operation from rotation in a direction opposite to the oppositely facing gear to rotation in the same direction at a higher speed. The operation of the differential is automatically controlled and the drive is stepped up or reduced in accordance with the torque requirements.

Further details of the invention will appear from the following description.

In the form of the invention illustrated in the drawings, there is shown a drive shaft 20, a driven shaft 21, and a transmission casing 22 intermediate the shafts and housing the variable speed transmission mechanism.

The drive shaft 20 has a longitudinal recess 23 at the rear end thereof disposed within the casing. Shaft 20 is mounted in bearings 24 in the casing and the rear end thereof has formed thereon a gear 25 on which is formed a clutch member 26 which is adapted to coact with and engage a clutch member 27.

An intermediate shaft 30 extends into the recess 23 and is axially alined with the shaft 20. The clutch member 27 is splined on the shaft 30, as shown at 31.

The clutch member 27 has circumferential axially extending recesses 33 adapted to receive the clutch teeth of the clutch member 26 and also has peripheral recesses and clutch teeth 34, 35. The member 27 also has an annular groove 36 in which is positioned a clutch shifting yoke 37.

The shaft 30 is provided with an annular flange 40 and with an enlarged portion 41 beyond the flange. The flange 40 has formed thereon a plurality of clutch teeth 42.

A sleeve 43 surrounds the portion 41 of the shaft 30 and has an extension 44 to which is splined a sleeve 45 on which is mounted a bevel gear 46 which forms the left hand bevel gear of a differential gearing. The shaft 30 extends beyond the enlarged portion 41 through the sleeves 44 and 45 and has secured to the end thereof a collar 47 which has a portion 48 extending into and supporting or centering the sleeve 45. A spring 50 bears against the collar 47 and against the end of the sleeve 44 and tends to push the sleeve to the right, viewing Fig. 1.

A pin 49 extends through the shaft and is adapted to engage the outer end of the sleeve 45 which has a plurality of notches A', B', C' and D', the notch D' being deeper than the other notches. The shaft 30 has a limited endwise movement permitting the pin to engage the notches in different positions of adjustment thereof as hereinafter described.

Figure 5:
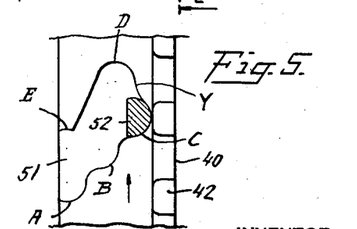
Fig. 5 is a plan view, on an enlarged scale, showing the construction of the torque controlled automatic shifting mechanism.
Figure 6:
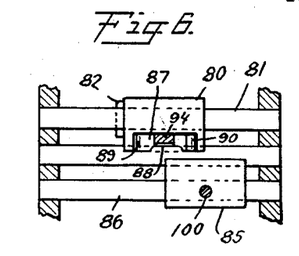
Fig. 6 is a plan view, partly in section, illustrating certain parts of the gear shifting mechanism.

The periphery of the enlarged portion 41 of the shaft 30 is provided with a plurality of inwardly extending recesses 51 which, as shown particularly in Fig. 5, are provided with a series of arcuate rests, steps or ledges designated A, B, C, D and E, corresponding to notches A', B', C' and D' in sleeve 45.

The portion 43 of the sleeve has formed thereon or secured thereto, a plurality of radially extending lugs 52, one lug being provided for each of the recesses or slots 51 in the shaft portion 41.

A gear 60 is rotatably mounted on balls 61 carried by the outer surface of the sleeve 43. A sleeve 62 is secured to the gear 60 and is provided with a flange 63 forming an annular groove 64 in which is positioned a clutch shifting yoke 65. Clutch teeth 66 extend inwardly from the sleeve 62 and are adapted to coact with the clutch teeth 42 carried by the flange 40 on the shaft 30.

The gear 60 also has a plurality of clutch teeth 70 which are adapted to engage and coact with teeth 71 carried by a sleeve 72 which forms an enlarged extension on a sleeve 73 to which is connected the right hand bevel gear 74 of the differential mechanism. Clutch teeth 75 extend inwardly from the sleeve 72 and are adapted to coact with clutch teeth 76 which are formed on the sleeve 43. The sleeve 72 has secured thereto or formed thereon, a gear 77.

The clutch yoke 37 is carried by a block 80 slidably mounted on a rod 81. The clutch yoke 65 is carried by a block 85 which is slidably mounted on a rod 86. The block 80 has formed therein a recess 87 having a lower portion 88 and elevated ledges 89 and 90.

A gear control lever 91 is swiveled in the usual way at 92 and has slidably and nonrotatably mounted on the lower end thereof, a sleeve 93 having a reduced extension 94. The extension 94 is normally retained in the bottom or lower portion 88 of the recess 87 by means of a spring 95 which encircles the lever 91 below the swivel joint 92 and engages the upper end of the sleeve 93.

The block 85 is actuated by a pin 100 carried by a bar 101 which is controlled by a lever having arms 102 and 103 mounted on a pivot 104. The lower end 102 of the lever is connected to the bar 101 by a pin and slot connection 105 and a similar connection 106 is provided at the upper end of the lever between the arm 103 and a post 107 which extends upwardly through a floor board 108. The upper end of the post is pivoted at 109 to a foot pedal 110 which is mounted on a fixed pivot 111 and has a rearwardly extending portion 112. A spring 113 encircles the post or link 107 and tends to maintain the pedal 110 in the position shown in Fig. 1.

A plate 115 is slidably mounted beneath the floor board 108 and is provided with a slot through which the link or post 107 extends. A spring 116 engages the plate and tends to press the plate upwardly. The link or post 107 has a pair of notches 120 and 121 in one edge thereof adapted for engagement by the slidably mounted plate 115 when the pedal is depressed.

The usual clutch mechanism is utilized for connecting the shaft 20 to the engine shaft and the clutch is controlled by the usual clutch pedal 125. The upper end of the clutch pedal pedal 125 has a plate 126 adapted to be engaged by the foot of the operator and adapted also when depressed to engage the pedal 110. The clutch pedal or arm 125 has formed on the under surface thereof, a cam 127 which is adapted to press the plate 115 downwardly and release the plate from either of the notches 120, 121 when the clutch pedal moves upwardly to the position shown in Fig. 1.

A countershaft 130 is mounted in the transmission case and is disposed parallel to the shafts 20, 30 and axis of the differential gearing. A gear 131 is rotatably mounted on the shaft 130 and meshes with an idler gear 132 carried by a jack shaft 133, the gear 132 meshing with the gear 25 which is connected to and driven by the shaft 20.

The gear 131 is freely rotatable in one direction but is prevented from reverse rotation by an overrunning or one way clutch which consists of a plurality of rollers or balls 134 which are engageable with an annular surface 135 of the gear and are mounted between this surface and cams 136 which are fixed to the casing. The balls or rollers 134 are actuated in one direction by springs 137. It will be obvious that the gear 131 can rotate freely in one direction but will be effectively prevented from rotation in the opposite direction by the action of the balls or rollers 134, annular surface 135, and cams 136.

The gear 131 is carried by a hub or sleeve 140 which carries a clutch member 141. The clutch member 141 is adapted to coact with a clutch member 142 formed on the end of a sleeve 143 having secured thereto or formed thereon a gear 144. The gear 144 meshes with the gear 60 above described.

The sleeve 143 is controlled by a clutch shifting yoke 150 having bifurcated lower ends embracing pins 151 carried by the sleeve. The yoke 150 is carried by a spindle 152 to which is connected an arm 153, the opposite end of which is connected by a link 154 to the sleeve 93. The yoke also has connected thereto, a lug 155 which is adapted to enter one of the recesses between the clutch teeth 35 on the clutch member 27. The movement of the yoke in one direction is limited by a stop lug 156 which is adapted to abut against the outer end of the flange 63.

The gear 144 or the end of the sleeve 143 by which the gear is carried, has formed thereon a clutch member or teeth 160 which are adapted to coact with corresponding clutch teeth 161 carried by a gear 162. The gear 162 meshes with a gear 77 carried by a sleeve 72.

The driven shaft 21 is connected to the differential housing 165 which carries the planetary gears 166, which in turn mesh with the gears 46 and 74.

Figure 1:
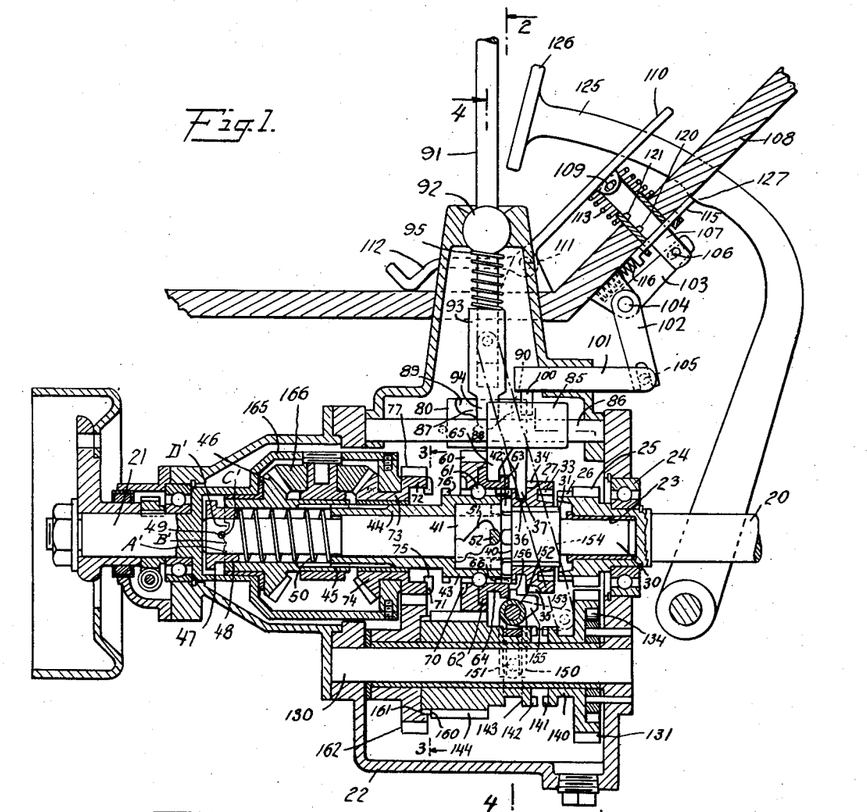
Fig. 1 is a sectional elevation of a transmission casing and transmission mechanism therein and means for operating the transmission.

In general, the rate of rotation of the driven shaft is controlled by the operation of the right hand bevel gear 74, viewing Fig. 1. For instance, assuming first, that the left hand gear 46 is connected by direct drive to the drive shaft 20, if the right hand gear 74 is held stationary, the driven shaft will be rotated at a two to one reduction in speed. Second, if the gear 74 is rotated in a direction opposite to the direction of rotation of the gear 46, then the driven shaft 21 will be rotated at a reduction in speed greater than a two to one reduction. Third, if the gear 74 is rotated in the same direction as the gear 46 and at the same speed, direct drive will be obtained. Fourth, if the gear 74 is rotated in the same direction as the gear 46 and at a greater speed, the speed of rotation of the shaft 21 will be stepped up above direct drive or an over direct drive will be obtained.

The first two drives mentioned in the preceding paragraph or, in other words, the reduction of two to one and greater than two to one, are obtained when the lugs 52 are disposed in the notches or steps A of the recesses 51. The third drive mentioned, or the direct drive, is obtained when the lugs 52 are in engagement with the steps or notches B. The over speed drive which was mentioned fourth is obtained when the lugs are in the steps or notches C.

OPERATION

*Lowest speed reduction drive*

Assuming that the transmission is mounted in a motor vehicle, when the car is started the procedure is conventional since the clutch pedal 125 is depressed all the way. As the clutch pedal is being depressed, the foot pedal 110 is also depressed, causing the bar 101 to be pushed to the left, viewing Fig. 1. The pin 100 carried by the bar 101 will cause the block 85 to move to the left, which in turn will move the yoke 65, gear 60, and sleeve 43, 44 to the left, whereupon the clutch member 70 carried by the gear 60 will engage the clutch member 71 carried by the sleeve 72.

Figure 7:
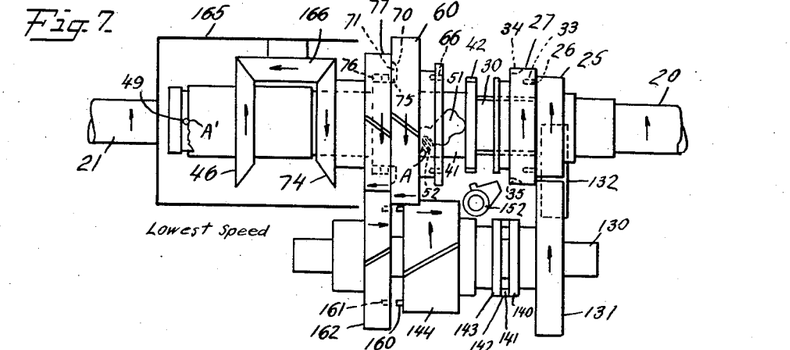
Fig. 7 is a diagrammatic elevational view showing the transmission mechanism adjusted for low speed transmission.

The parts are shown in the position described, in Fig. 7. The movement of the sleeve 43 to the left will cause the lugs 52 to seat in the notches or steps A in the recesses 51 of the shaft portion 41.

The clutch shifting rod 91 is then pulled toward the operator as far as possible. This will cause the block 80 to be moved to the right, viewing Fig. 1, thus causing the yoke 37 to move the clutch member 27 into engagement with the clutch member 26. Furthermore, as the rod 90 is swung as far as possible in an anti-clockwise direction or toward the operator, the lower end 94 of the sleeve 93 will ride upwardly into the portion 90 of the recess 87. This will cause the sleeve 93 to move upwardly on the rod 91 and the link 154 will pull the arm 153 upwardly, causing the clutch yoke 150 to move the clutch members 141 and 142 into engagement with each other. During this movement the sleeve which carries the gear 144 will be moved to the right, disconnecting the clutch members 160 and 161.

When the foregoing operations have been carried out, the following driving connections will be made. The drive will be transmitted from the shaft 20 through the clutch members 26 and 33 and the member 27 to the shaft 30 which is splined to the member 27. Shaft 30 through the portion 41 thereof transmits its motion by means of steps in the recesses 51 to the lugs 52 which are carried by the sleeve 43, 44. The sleeve 44 is splined to the sleeve 45 which carries the left hand gear 46. Gear 46 will, therefore, be driven direct or at the speed of rotation of the shaft 20.

The drive between the shaft 20 and the gear 74 is accomplished through the following gearing. The gear 25 is carried directly by the shaft 20 and rotates the idler gearing 132, which in turn rotates the gear 131. This gear is clutched to the gear 144 through the clutch members 140 and 141. The gear 144 in turn meshes with gear 60 which is clutched to the sleeve 72 and this sleeve is formed integral with the sleeve 73 which carries the right hand gear 74. By the driving connections outlined, the gear 74 will be rotated in a direction opposite to the direction of rotation of the gear 46 and this will cause the housing to rotate at a reduction in speed greater than a two to one reduction and preferably slightly greater than a three to one reduction in speed.

After the clutch shift lever has been operated, the clutch pedal is released but not all the way as it is held slightly depressed to prevent the cam 127 from releasing the slide 115 from the notch 121. It should be understood, however, that when the clutch pedal is held in the slightly depressed position mentioned, that the clutch is all the way in, there being a certain amount of free movement on the depression of the clutch pedal prior to the releasing of the clutch.

Second speed operation

Figure 8:
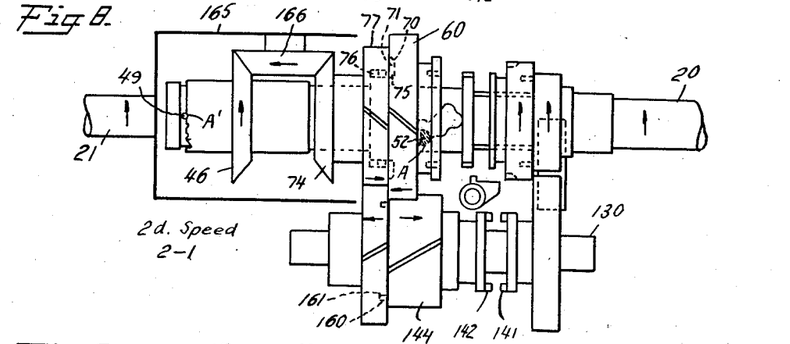
Fig. 8 is a view similar to Fig. 7 but showing the mechanism adjusted for second speed transmission.

After the car has been started, the gas feed is momentarily diminished so as to temporarily relieve the driving force between the gear 144 and the gear 131 or, in other words, between the clutch members 141 and 142. The clutch shifting rod 91 is then permitted to center itself and the sleeve 93 will move to vertical position, causing the link 154 to move the arm 153 downwardly and release the engagement between the clutch members 141 and 142. As the gear 144 is moved to the left, the clutch members 160 and 161 will positively clutch the gear 144 to the gear 162. This position is illustrated in Fig. 8, wherein it will be seen that the gear 60 is clutched to the sleeve 72 which carries the gear 77, and the gears 144 and 162 are also clutched together. The number of teeth in the gear combination 144 and 60 is different from the number of teeth in the combination of the gear 162 and 77. For instance, gear 60 may have thirty teeth, gear 144 eighteen, gear 162 twenty-four, and gear 77 twenty-four. Since these two sets of gears are clutched together, 144 and 162 must rotate together, and 60 and 77 must also rotate together. However, gear 60 meshes with gear 144 and gear 77 meshes with gear 162. The only condition under which the two sets of gears could rotate would be that condition in which the gear ratios between both sets were equal. Since they are not equal, no rotation can take place and the gears will remain stationary.

Gear 46 will be rotated by the direct drive above explained, but gear 74 being carried by the sleeve on which the gear 77 is mounted will be held stationary. The housing and driven shaft will, therefore, be driven at a two to one reduction.

Direct drive

Figure 9:
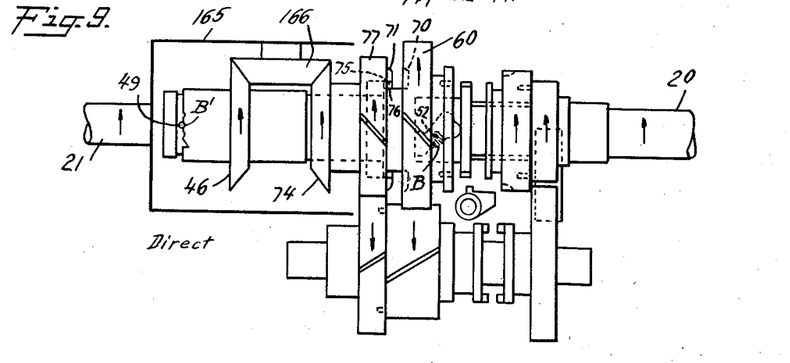
Fig. 9 is a view similar to Fig. 7 but showing the parts adjusted for transmitting the drive at direct speed.

From the second speed or two to one reduction to direct drive, the following operations take place: The gas feed is temporarily diminished, causing the lugs 52 to be released from the notch or step A, whereupon the spring 50 will push the sleeve 44 and the lugs carried thereby longitudinally relative to the shaft 30, 44. The lugs will then come to rest in the notch or step B. This condition is illustrated in Fig. 9. As the sleeve 44 is moved longitudinally, the gear 60 will move out of clutching engagement with the sleeve 72 which carries the gear 77. When the lugs are disposed in the notch B, the clutch members 75 and 76 will be moved into operative relation. When this takes place the sleeve 72 will be clutched to the sleeve 44 or to the portion 43 thereof and will, therefore, be driven at the same speed. Under these conditions the left hand and the right hand bevel gears will rotate in the same direction at the same speed. The housing 165 and driven shaft will thereupon also rotate in the same direction and at the same speed as the two bevel gears 46 and 74 or at the same speed as the drive shaft.

Over direct drive

Over direct drive is obtained by temporarily releasing the pressure between the lugs 52 and the notches or ledges B by diminishing gas supply, whereupon the spring 50 will shift the sleeve 44 and portion 43 thereof to the right, viewing Fig. 1, causing the lugs to enter the notches or steps C. When this takes place the clutch members 75 and 76 will be disengaged and the clutch members or teeth 42 and 66 carried respectively by the flange 40 and the sleeve 63 will move into operative relation with each other. The shaft 30 will now drive the gear 60, which in turn will drive the gear 144. Gear 144 is clutched to gear 162 which meshes with gear 77 and will thus drive the sleeve 72, 73 and gear 74. Due to the gear drive between the shaft 30 and the gear 74, the latter gear will be rotated at a higher speed and in the same direction as the gear 46. The resultant speed of the housing and the driven shaft will be equal to the sum of the rates of rotation of the gears 46 and 74 divided by two. Thus, an over direct speed will be obtained.

Free wheeling

Figure 11:
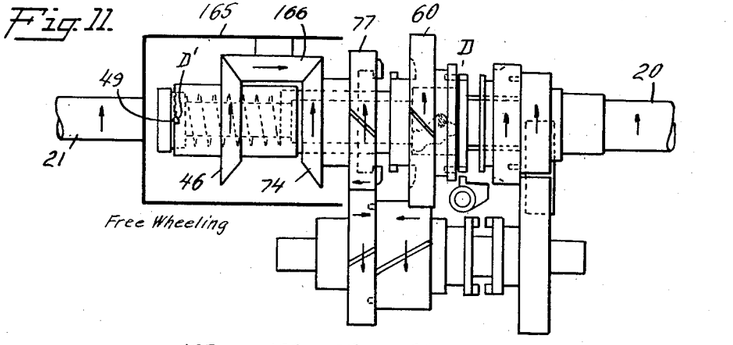
Fig. 11 is a view similar to Fig. 7 but showing the transmission mechanism adjusted for "free wheeling".

Free wheeling will be obtained automatically when the car is rolling at such a speed that the differential housing will rotate faster than the engine is turning over. Under these conditions the lugs 52 on the sleeve 43 will shift to the notches or ledges D. When the sleeve is disposed in this position, which is shown in Fig. 11, the gear 60 will be declutched from the intermediate shaft 30 and can rotate freely. There is, therefore, no driving connection which prevents the free rotation of the right hand bevel gear 74.

After the car has been free wheeling, if the engine is speeded up the lugs 52 will automatically shift to the notches or steps C, thus shifting to the over direct drive transmission.

In order to prevent free wheeling it is necessary merely to maintain pressure on the rear end 112 of the level or foot pedal 110. This will prevent any shifting of the block 85, clutch yoke 65, gear 60 and sleeve 43, 44 to the left and unless the sleeve is shifted to the left relative to the shaft portion 41, the lugs 52 carried by the sleeves cannot enter the notches D which control the free wheeling. To drive the car again after free wheeling it is merely necessary to increase the gas feed and speed up the engine, whereupon the lugs 52 will shift from the free wheeling ledge D to the over direct drive ledge C. Attention is called to the incline Y between the ledges D and C, since the lugs naturally ride into the ledges C as the engine again takes the drive of the car.

Action preventing back rolling

Figure 2:
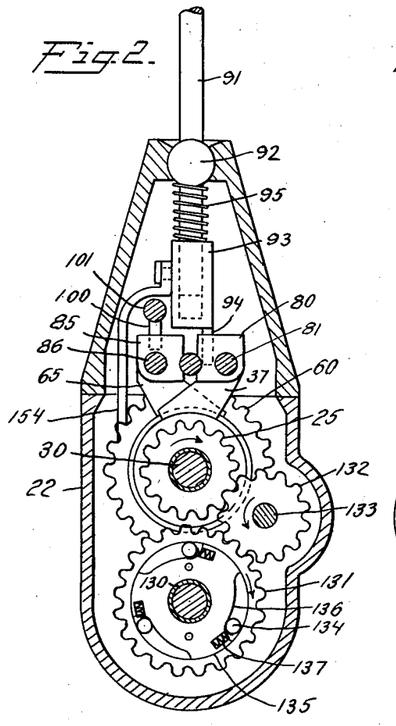
Fig. 2 is a vertical sectional elevation taken substantially on line 2—2 of Fig. 1, looking in the direction of the arrows.
Figure 3:
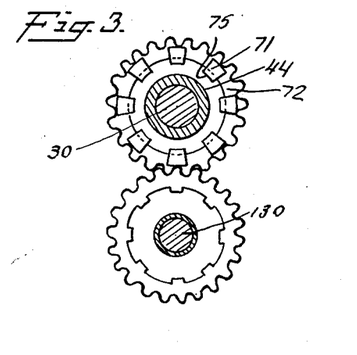
Fig. 3 is a sectional elevation taken substantially on line 3—3 of Fig. 1, looking in the direction of the arrows.
Figure 4:
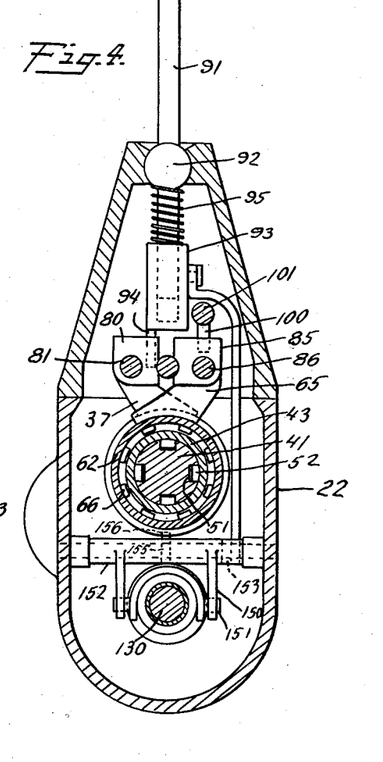
Fig. 4 is a vertical sectional elevation taken substantially on line 4—4 of Fig. 1, looking in the direction of the arrows.

The transmission, in addition to having the functions and advantages hereinbefore described, also acts effectively and positively to prevent any back rolling of the car when, for instance, the car is stopped on an incline or hill. This action is obtained by means of the overrunning or one way clutch between the gear 131 and the transmission casing. This gear, as described and as shown particularly in Fig. 2, can rotate only in one direction. When the clutch is pushed out all the way, thereby depressing the pedal 110, and the shifter rod or lever is pulled back, the gears 60 and 77 will be clutched together in the position shown in Fig. 7 or 8 and the clutch members 26 and 33 are connected. Assuming that the lugs 52 are in the ledge A and that the gear shift lever 91 has not been pulled back a sufficient distance to shift into the lowest reduction, the connection between the clutch members 26 and 33 will operatively connect the left hand gear 46 to the shaft 30 through the sleeves 45 and 44, lugs 52, shaft 41, 30. The clutch member 27 is splined to the shaft 30 and is clutched to the gear 25, which in turn meshes with the idler gear 132. The gear 132 meshes with gear 131. If the car tends to roll backward, this will tend to cause the gear 46 to rotate backward, but since this gear is connected by the driving connections just described to the gear 131, and since the gear 131 is prevented from backward rotation by the one way clutch, the gear 46 cannot rotate in a backward direction. Furthermore, the gear 74 will be locked against rotation since this gear is clutched to the gear 60 and gear 60 is prevented from rotation by the interlocking of the gears 60, 77 and gears 144, 162 in the manner described in connection with the description of the operation of the second speed transmission.

Figure 10:
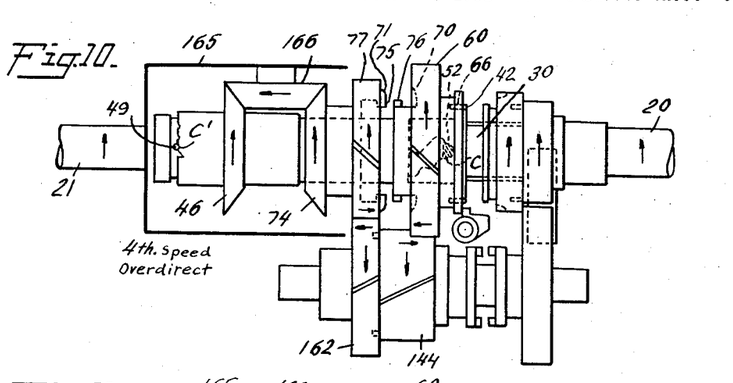
Fig. 10 is a view similar to Fig. 7 but illustrating the parts connected for over direct or over speed transmission.

If the shift lever is operated to such a position that the transmission is adjusted for the lowest speed reduction, both the left hand and right hand gears will be locked in a similar manner, but in this case the gears will be prevented from rotating by the one way clutch of the gear 131 through the driving connections including the gear 144 and clutch members 141 and 142. On the other hand, if the transmission is set for the over direct drive shown in Fig. 10, the left hand gear will be prevented from rotating in the manner hereinbefore described and the right hand gear will be held since the sleeve 43, 44 is clutched directly to the shaft 30 by the connection 42, 66.

Reverse

Figure 12:
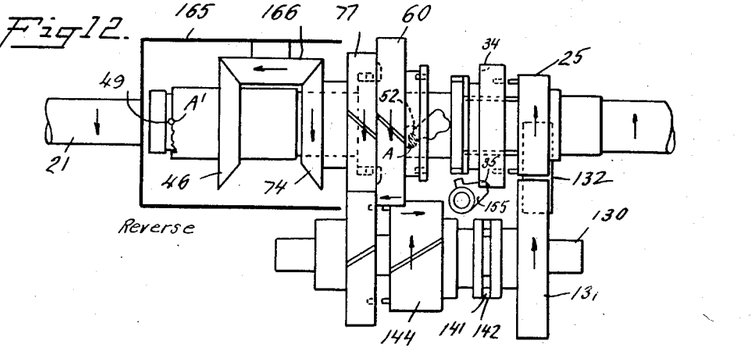
Fig. 12 is a view similar to Fig. 7 but showing the transmission mechanism adjusted for reverse drive.
Figure 13:
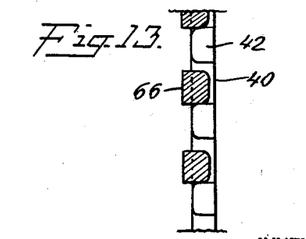
Fig. 13 is an enlarged view or development showing certain clutch connections between parts of the transmission.

The driving connections for reverse drive are shown in Fig. 12. In order to shift into reverse the clutch pedal is depressed and the shifter rod is pushed forward all the way. As the clutch pedal is pushed down, the foot pedal 110 will also be depressed, thus causing the clutch yoke 65 to shift gear 60 to the left and to clutch this gear to the sleeve 72. The block 80 cannot be shifted to the left on the rod 81 by the movement of the gear shift lever 91 forwardly since a stop pin 82 on the rod 81 prevents such movement. However, the sleeve 93 will be forced upwardly into the left hand portion of the recess 87, viewing Fig. 1, thus exerting an upward pull on the link 154 and causing the clutch members 141 and 142 to be engaged. At the same time the lug 155 will engage one of the recesses 34 in the periphery of the clutch member 27 and hold this clutch member against rotation. The member 27 is splined to the shaft 30, which in turn is connected through the various driving connections hereinbefore described to the left hand gear 46. Since the member 27 is held from rotation, the gear 46 will also remain stationary.

The right hand gear 74 will be driven in a reverse direction from the gear 25 through the idler 132, gear 131, clutch connection 141, 142, gear 144, gear 60 and sleeve 72, 73. Since the left hand gear 46 is stationary and the right hand gear 74 is driven in a reverse direction, the housing and driven shaft will be driven in a reverse direction at low speed, as a matter of fact, at a speed lower than the lowest forward speed.

Use of engine as brake through low speed gearing

It is often desirable to use the engine as a brake in descending a steep hill or making a quick stop and the transmission above described permits such use. By depressing the foot pedal 110 as far as possible, the gearing will be shifted to the notch or ledge E which is disposed opposite the ledge A, in which position the right hand gear 74 is held stationary, thus giving a two to one reduction. If the operator depresses the clutch pedal 125 all the way, the pedal 110 will shift the gearing in the same manner, but the clutch pedal must be then released for otherwise the transmission will be disconnected from the engine. The two to one reduction will, in practically all cases, be sufficient for use in braking but, if desired, the lowest gear reduction can be thrown in by pulling the clutch shift lever, thus connecting the gearing for driving the right hand gear 74 in a reverse direction.

When the drive has been manipulated in the manner described in the preceding paragraph, the lugs 52, as above set forth, will engage the ledges or notches E, since at this time the car is driving the engine instead of vice versa. When the engine is again speeded up or the torque furnished by the engine overcomes the torque requirements, the lugs 52 will automatically shift from the ledges E to the ledges A and the engine will again drive the car. In order to assure the shifting of the lugs in the manner described, pressure may be maintained on the heel or rear end 112 of the foot pedal 110. This will prevent any relative longitudinal movement between the sleeve 43 and the portion 41 of the shaft 30.

The gears 60, 144, 162 and 77 are preferably spiral gears, as illustrated in the diagrammatic showing in Fig. 7. The spiral teeth are so arranged that when the engine is driving the car through the gearing, the thrust of the spirals tends to shift the gearing from a high speed to a lower speed and vice versa. When the car is driving the engine or is rolling faster than the rotation of the engine, the spirals will tend to shift from a lower speed to a higher speed. For instance, in Fig. 10 the direction of thrust, due to the spiral gearing, is indicated by the arrows and the thrust of the gears or spirals in free wheeling is indicated by the arrows in Fig. 11. The thrust of the spiral teeth on gear 60 in over direct (see Fig. 10) is in a direction to move the sleeves 62 and 44 against the action of spring 50. The shaft 30 has a tendency to move toward the right but this is prevented by the pin 49 which bears against the end of sleeve 45. Thus, sleeves 44 and 62 must move to the left under a predetermined torque and shift to direct drive.

When the shaft 21 is the drive shaft, as in Fig. 11, the thrust on gear 60 is toward the right. Since gear 60 has more teeth than gear 144 and is thus reduced in speed of rotation and has greater torque it can free itself from the clutch connection 42, 46. Then as lugs 52 move into the ledge D the pin 49 moves into notch D' on sleeve 45 allowing shaft 30 to shift slightly to the right so that gear 60 is free.

The notches A', B', C' and D' in the end of sleeve 45 correspond in position to the ledges A, B, C and D in the shaft portion 41 which determine the position of lugs 52 carried by sleeve 43, 44. Sleeve 44 is splined to sleeve 45.

It will be understood that although the various speed changes from low to high and vice versa are obtained through the arrangement shown by the variations in the torque requirements, the gearing can be shifted to place the lugs 52 in the ledges A, B and C by means of the manipulation of the foot pedal 110. Also, the variations in the torque requirements can be prevented from automatically shifting the gearing by maintaining pressure on the heel 112 of the foot pedal. The foot pedal 110, as hereinafter described, is placed adjacent to and in the path of movement of the clutch foot rest 126. Thus the depression of the clutch pedal will operate the foot pedal, but the foot pedal can be independently engaged and operated. If the pedal 110 is depressed to an extent sufficient to cause the slide 115 to engage the notch 120, the drive shown in Fig. 9 or, in other words, the direct drive, will be secured. If the notch 121 is engaged, the low speed shown in Fig. 8 will be secured or if the notch 121 is engaged and the clutch shifting lever 91 is pulled by the operator all the way to the rear, the lowest speed reduction shown in Fig. 7 will be obtained. The driving torque of the engine will maintain the lugs 52 on the ledges through which the drive is being secured as long as the engine torque exceeds the torque requirements of the car. However, if the car rolls faster than the engine is turning over, the drive will shift to the ledges D and the car will free wheel. In order to prevent the automatic shift, pressure is maintained on the heel 112 of the pedal 110.

In order to prevent the disengagement of the teeth 75 and 76 before the clutch members or teeth 70 and 71 are engaged, in the shift from direct drive to the second speed or two to one speed, the teeth 75 and 76 are so dimensioned that the teeth 76 cannot run freely in the clearance spaced beneath the sleeve 72 prior to the engagement of the clutch members 70 and 71. Also, to facilitate this shift the teeth 75 are slightly beveled so that as the teeth 76 move to the left relative thereto, a slight pull will be exerted on the sleeve 44, tending to move the teeth 70 and 71 into operative engagement with each other.

From the foregoing description it will be seen that the various driving speeds are obtained, with the exception of the shift from the lowest speed to the second speed, by changing the relative positions of the sleeve 43 and portion 41 of the shaft 30. These shifts are torque controlled or, if desired, may be controlled by the foot pedal 110. To recapitulate and summarize, the following conditions obtain in the different positions of adjustment of these members.

With the lugs 52 in the ledges or notches A, gear 60 is clutched to the sleeve 72, and for the lowest speed, gear 74 is rotated backwardly relative to the rotation of the gear 46 through the gearing drive of the gear 60. In this same notch for the two to one drive the gear 60 is locked and being clutched to the gear 74 locks this gear.

In the position B, the sleeve 43 is clutched to 72 and the gear 74 rotates in the same direction and at the same speed as the gear 46, thus giving direct drive.

In the position C, the gear 60 is clutched to the flange 40 formed on the shaft 30 and through the gears 60, 144, 162 and 77 drives the gear 74 in the same direction as the gear 46 and at a higher speed, thus giving over direct drive.

When the forward drives obtained in the positions A, B and C are operating, the clutch members 26 and 27 are engaged by the movement of the shift lever 91 toward the operator. If the lever is pulled to extreme position, the clutch members 141 and 142 will be engaged, this condition obtaining when the gear 74 is being driven in a reverse direction for the lowest speed.

From the foregoing specification it will be evident that a simple, practical and efficient variable speed transmission mechanism has been designed and that by means of the structure described, four forward driving speeds can be obtained. Furthermore, the shift from low speed to over direct through the various steps is made automatically under the control of the torque. The transmission described also permits free wheeling and an automatic shift from free wheeling to over direct when the engine again takes the load. Moreover, the engine can be used for braking through the low speed reduction gearing and the engine will again take the load as it is accelerated after the braking operation.

It should be understood that the invention is not limited to the use of differential gearing of the form shown but that other forms of planetary or epicyclic gearing may be used, if desired. Furthermore, the terms "differential" and "planetary" are used throughout the specification and claims in the broad sense and should be given a liberal interpretation.

In addition to providing an automatic shift, four speed transmission, means has been incorporated for preventing the automatic shift when desired and also for obtaining the various driving speeds by manual operation. The transmission mechanism also includes means operative to prevent back rolling or backing down a hill.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A variable drive transmission comprising a drive shaft, a driven shaft, planetary gearing comprising three elements, one element being connected to the drive shaft, a second element being connected to the driven shaft, and variable driving connections between the third element and the drive shaft whereby the said element can be driven in a direction opposite to the direction of drive of the first element, can be positively locked against rotation, can be driven in the same direction and at the same speed as the first element, or can be driven in the same direction and at a higher speed than the first element, torque controlled means for automatically shifting said variable speed driving connections, and manually controlled means for shifting said connections.

2. A variable drive transmission comprising a drive shaft, a driven shaft, planetary gearing comprising three elements, one element being connected to the drive shaft, a second element being connected to the driven shaft, and variable driving connections between the third element and the drive shaft for varying the direction of drive and the speed of the third element, torque controlled means for shifting said variable driving connections, and means for preventing the operation of said torque controlled shifting means.

3. A variable drive transmission comprising a drive shaft, a driven shaft, planetary gearing comprising three elements, one element being connected to the drive shaft, a second element being connected to the driven shaft, and variable driving connections between the third element and the drive shaft for varying the direction of drive and the speed of the third element, torque controlled means for shifting said variable driving connections, means for preventing the operation of said torque controlled shifting means, and manually controlled means for shifting said variable speed connections.

4. A variable speed transmission comprising a drive shaft, a driven shaft, connections between said shafts for driving the driven shaft faster than the drive shaft, means for automatically rendering inoperative said driving connections and permitting free wheeling when the driven shaft is rotating faster than the drive shaft, and torque controlled means for automatically shifting to over direct drive from free wheeling in response to increased torque applied to the drive shaft.

5. A variable speed transmission comprising a drive shaft, a driven shaft, connections between said shafts for driving the driven shaft faster than the drive shaft, means for automatically rendering inoperative said driving connections and permitting free wheeling when the driven shaft is rotating faster than the drive shaft, and torque controlled means for automatically shifting to over direct drive from free wheeling when the drive shaft is rotated at a predetermined rate of speed relative to the rate of rotation of the driven shaft.

6. A variable speed transmission comprising a drive shaft, a driven shaft, means including differential gearing and variable speed gearing connected to one of the elements of said differential gearing for transmitting the drive from the driving to the driven shaft, gear shift mechanism for said variable speed gearing including a pair of relatively movable rotatable elements, one element having a plurality of steps and the other element having a portion engageable with said steps, said elements, steps and step engaging portion being so arranged that different gearing connections to the differential element will be made in different positions of adjustment of the steps and step engaging portion.

7. A variable speed transmission comprising a drive shaft, a driven shaft, means including differential gearing and variable speed gearing connected to one of the elements of said differential gearing for transmitting the drive from the driving to the driven shaft, gear shift mechanism for said variable speed gearing including a pair of relatively movable power transmitting elements, one element having a plurality of steps and the other element having a portion engageable with said steps, means tending to shift said portion from one step to another, said elements, steps and step engaging portion being so arranged that different gearing connections to the differential element will be made in different positions of adjustment of the steps and step engaging portion.

8. A variable speed transmission comprising a drive shaft, a driven shaft, means including differential gearing and variable speed gearing connected to one of the elements of said differential gearing for transmitting the drive from the driving to the driven shaft, gear shift mechanism for said variable speed gearing including a pair of relatively movable rotatable elements, one element having a plurality of steps and the other element having a portion engageable with said steps, said elements, steps and step engaging portion being so arranged that different gearing connections to the differential element will be made in different positions of adjustment of the steps and step engaging portion, and one step being so arranged that when the step engaging portion is disposed thereon, the driven shaft can rotate freely relative to the drive shaft and the driving connection to the drive shaft from the driven shaft will be broken.

9. A variable speed transmission comprising a drive shaft, a driven shaft, means including differential gearing and variable speed gearing connected to one of the elements of said differential gearing for transmitting the drive from the driving to the driven shaft, gear shift mechanism for said variable speed gearing including a pair of relatively movable power transmitting elements, one element having a plurality of steps and the other element having a portion engageable with said steps, said elements, steps and step engaging portion being so arranged that different gearing connections to the differential element will be made in different positions of adjustment of the steps and step engaging portion, and furthermore so arranged that the torque on the driven shaft will control the shift from one step to another.

10. A variable speed transmission comprising a drive shaft, a driven shaft, variable speed driving connections between said shafts, and means dependent on the torque ratio between the driving and driven shafts for holding said variable speed driving connections in a plurality of definite positions of adjustment, including reduced drive, direct drive and over direct drive of the driven shaft.

11. A variable speed transmission comprising a drive shaft, a driven shaft, variable speed driving connections between said shafts, and means dependent on the torque ratio between the driving and driven shafts for holding said variable speed driving connections in a plurality of positions of adjustment, one of said positions permitting the driven shaft to rotate free of the driving shaft and at a greater speed.

12. A variable speed transmission comprising a drive shaft, a driven shaft, variable speed driving connections between said shafts, means including a pair of relatively adjustable members for adjusting said connections to transmit the drive from the driving to the driven shaft, means including a part carried by one member and a pair of ledges carried by the other for holding said members in said adjusted position, said part being disposed on one ledge when the driven shaft is driving the drive shaft and on the other ledge when the drive shaft is driving the driven shaft.

13. A variable speed transmission comprising a drive shaft, a driven shaft, variable speed driving connections between said shafts, means including a pair of relatively adjustable members for adjusting said connections to transmit the drive at low speed from the driving to the driven shaft, means including a part carried by one member and a pair of ledges carried by the other for holding said members in said adjusted position, said part being disposed on one ledge when the driven shaft is rotating at predetermined speeds relative to the rate of rotation of the drive shaft and on the other ledge when the drive shaft is driving the driven shaft.

14. A variable speed transmission comprising a drive shaft, a driven shaft, variable speed driving connections between said shafts, means including a pair of relatively adjustable members for adjusting said connections to transmit the drive at low speed from the driving to the driven shaft, means including a part carried by one member and a pair of oppositely facing ledges carried by the other for holding said members in said adjusted position, said part being disposed on one ledge when the driven shaft is driving the drive shaft and on the other ledge when the drive shaft is driving the driven shaft.

15. A variable speed transmission comprising a drive shaft, a driven shaft, variable speed driving connections between said shafts, and means dependent on the torque ratio between the driving and driven shafts for holding said variable speed driving connections in a plurality of positions of adjustment, said variable speed driving connections including intermeshing spiral gears so designed and arranged as to utilize the end thrust of the spiral gears to facilitate the shift of the driving connections.

16. A variable speed transmission comprising a drive shaft, a driven shaft, variable speed driving connections between said shafts arranged to drive the driven shaft at speeds ranging from speeds less than to speeds greater than the speed of the drive shaft, and torque controlled means for shifting the driving connections in accordance with torque requirements, said variable driving connections including intermeshing spiral gears so designed and arranged as to utilize the end thrust of the spiral gears to facilitate the shift of the driving connections.

EMIL ANDERSON.